United States Patent
Griffith et al.

(10) Patent No.: US 7,457,175 B1
(45) Date of Patent: Nov. 25, 2008

(54) DUAL DATA RATE MEMORY STROBE CHECKER

(75) Inventors: David L. Griffith, Fremont, CA (US); Michel P. Cekleov, Mountain View, CA (US)

(73) Assignee: 3Par, Inc., Fremont, CA (US)

( * ) Notice: Subject to any disclaimer, the term of this patent is extended or adjusted under 35 U.S.C. 154(b) by 211 days.

(21) Appl. No.: 11/552,107

(22) Filed: Oct. 23, 2006

(51) Int. Cl.
*G11C 7/00* (2006.01)

(52) U.S. Cl. .................................... 365/193; 365/233.1

(58) Field of Classification Search .................. 365/193, 365/233.1, 194
See application file for complete search history.

(56) References Cited

U.S. PATENT DOCUMENTS

| | | | | |
|---|---|---|---|---|
| 6,215,710 | B1 * | 4/2001 | Han et al. | 365/193 |
| 6,940,768 | B2 * | 9/2005 | Dahlberg et al. | 365/201 |
| 7,345,933 | B1 * | 3/2008 | Telem et al. | 365/193 |
| 7,394,707 | B2 * | 7/2008 | Seto et al. | 365/193 |

* cited by examiner

*Primary Examiner*—Anh Phung
(74) *Attorney, Agent, or Firm*—Patent Law Group LLP; David C. Hsia

(57) ABSTRACT

A memory controller includes a gate circuit gating a data strobe signal from a memory device, a delay circuit delaying the data strobe signal from the gate circuit, a read buffer capturing values of a data signal from the memory device in response to the data strobe signal, a cumulative strobe counter incrementing a detected strobe count by the number of edges detected in the data strobe signal, and a control logic controlling the gate circuit and receiving the detected strobe count from the strobe counter. The control logic enables and disables the gate circuit after the start of a preamble and before the end of a postamble in the data strobe signal, respectively. When the memory controller is not expecting the data strobe signal from the memory device, the control logic compares the detected and the expected strobe counts and reports a strobe error when they do not match.

13 Claims, 3 Drawing Sheets

DUAL DATA RATE MEMORY STROBE CHECKER

FIELD OF INVENTION

This invention relates to a memory controller for dual data rate (DDR) memory devices.

DESCRIPTION OF RELATED ART

In a typically single data rate (SDR) system, both the memory controller and the memory device (e.g., a synchronous dynamic random access memory) transmit and capture data in response to a single system clock. In a DDR system, the memory device outputs both a data signal DQ and a data strobe signal DQS that are edge-aligned with each other to the memory controller. The memory controller shifts data strobe signal DQS to center it with data signal DQ and then uses rising and falling edges of data strobe signal DQS to capture the values of data signal DQ. A preamble in data strobe signal DQS indicates the start of data transmission and a postamble in data strobe signal DQS indicates the end of the data transmission.

An unintentional transition in the data strobe signal DQS, often referred to as a "glitch," may be interpreted by the memory controller as a data strobe transition and cause the current value of data signal DQ to be captured. Such inadvertent capture corrupts the data being read. Missing strobe pulses can be caused by memory device failure where DQS data strobe signal is stuck in one state or is missing, or by software error that uses a nonexistent memory address. Thus, what are needed are a method and an apparatus to detect glitches in the data strobe signal.

SUMMARY

In one embodiment of the invention, a memory controller includes a gate circuit passing or blocking a data strobe signal from a memory device, a delay circuit delaying the data strobe signal from the gate circuit, a read buffer capturing values of a data signal from the memory device in response to the data strobe signal received from the delay circuit, a strobe counter incrementing a detected strobe count by the number of edges detected in the data strobe signal, and a control logic controlling the gate circuit and receiving the detected strobe count from the strobe counter. The control logic enables and disables the gate circuit after the start of a preamble and before the end of a postamble in the data strobe signal, respectively. When the memory controller is not expecting the data strobe signal from the memory device, the control logic compares the detected and the expected strobe counts and reports a strobe error when they do not match.

BRIEF DESCRIPTION OF THE DRAWINGS

Use of the same reference numbers in different figures indicates similar or identical elements.

DETAILED DESCRIPTION

Figure 1:
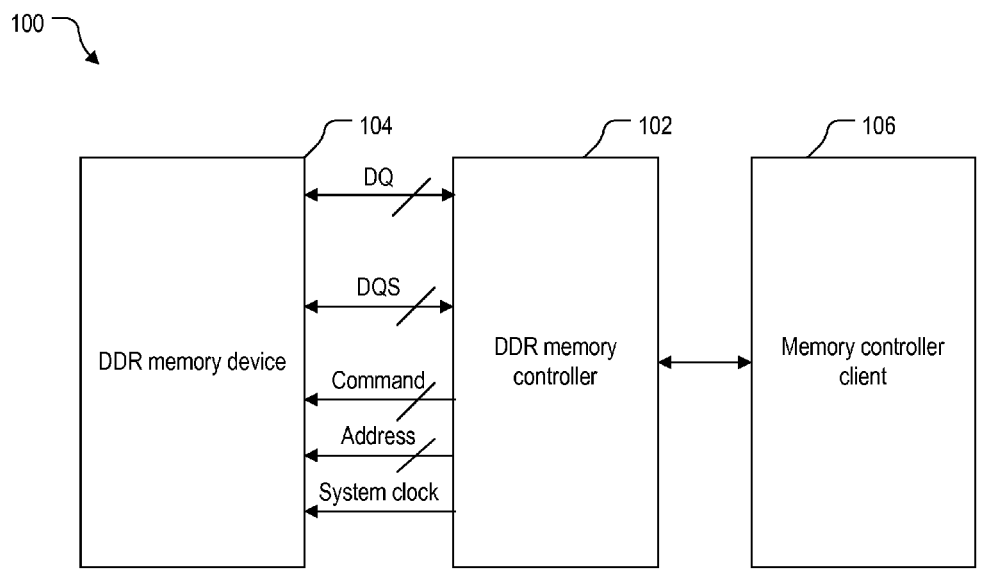
FIG. 1 is a block diagram of a data processing system including a memory controller coupled between a memory device and a memory controller client in one embodiment of the invention.

FIG. 1 is a block diagram of a data processing system 100 including a memory controller 102 coupled between a memory device 104 and a memory controller client 106 in one embodiment of the invention. Although only one memory device 104 is shown, memory controller 102 may be coupled to additional memory devices.

Memory controller 102 communicates with memory device 104 through a source synchronous interface while memory controller 102 communicates with memory controller client 106 through a synchronous interface with a system clock. In a read operation, memory controller 102 receives a read request from memory controller client 106 and then issues the appropriate read command and address to memory device 104. In response, memory device 104 returns data signals on DQ lines and a data strobe signal on a DQS line. For purposes of this disclosure, DQ and DQS are used to describe the signals and the lines on which the signals travel interchangeably.

In one embodiment, memory device 104 is a dual data rate (DDR) synchronous dynamic random access memory (SDRAM) module that has 72 DQ lines divided into 16 nibbles of 4 DQ lines where each nibble has its own DQS line. In one embodiment, memory controller 102 and memory controller client 106 can be part of a node controller in a data storage system described in commonly assigned U.S. patent application Ser. No. 09/883,681 filed on Jun. 18, 2001. In such an embodiment, memory device 104 can be the cache memory of the node controller, and memory controller client 106 can be a link interface, a logic engine, or a peripheral component interconnect (PCI) bus interface in the node controller. Memory device 104 may be a DDR SDRAM, a DDR2 SDRAM, a DDR3 SDRAM, or a future version of DDR SDRAM.

Figure 2:
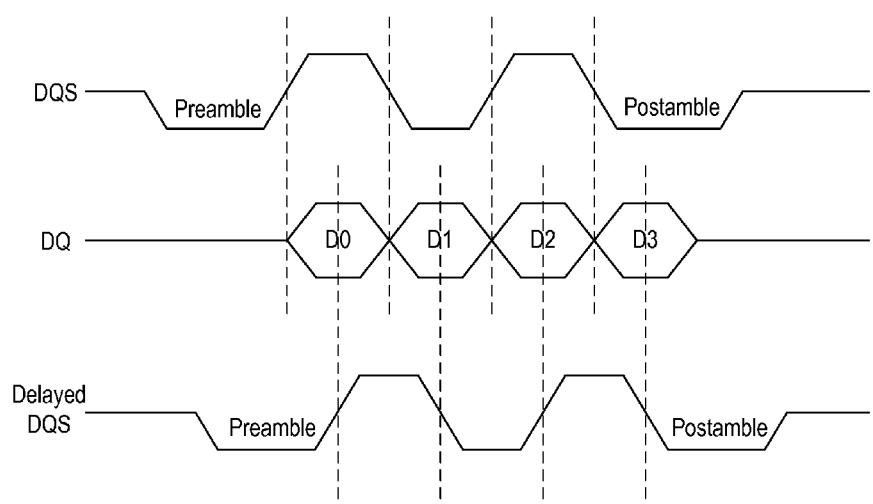
FIG. 2 is an exemplary timing diagram of communication between the memory controller and the memory device of FIG. 1.

FIG. 2 illustrates an exemplary timing diagram of a single data signal DQ and data strobe signal DQS. Prior to data transmission, data strobe line DQS is maintained at high impedance (also known as hi-Z, tri-stated, or floating). To prepare for the start of data transmission, memory device 104 pulls data strobe line DQS low to form a preamble. After the preamble, memory device 104 oscillates data strobe signal DQS and provides data signal DQ. To prepare for the start of the next data transmission or otherwise relinquish control of the line, memory device 104 pulls data strobe line DQS to high impedance to form a postamble. Memory controller 102 adds a delay to data strobe signal DQS so it is centered with data signal DQ. Memory controller 102 then captures the values of data signal DQ in response to the delayed data strobe signal DQS.

Figure 3:
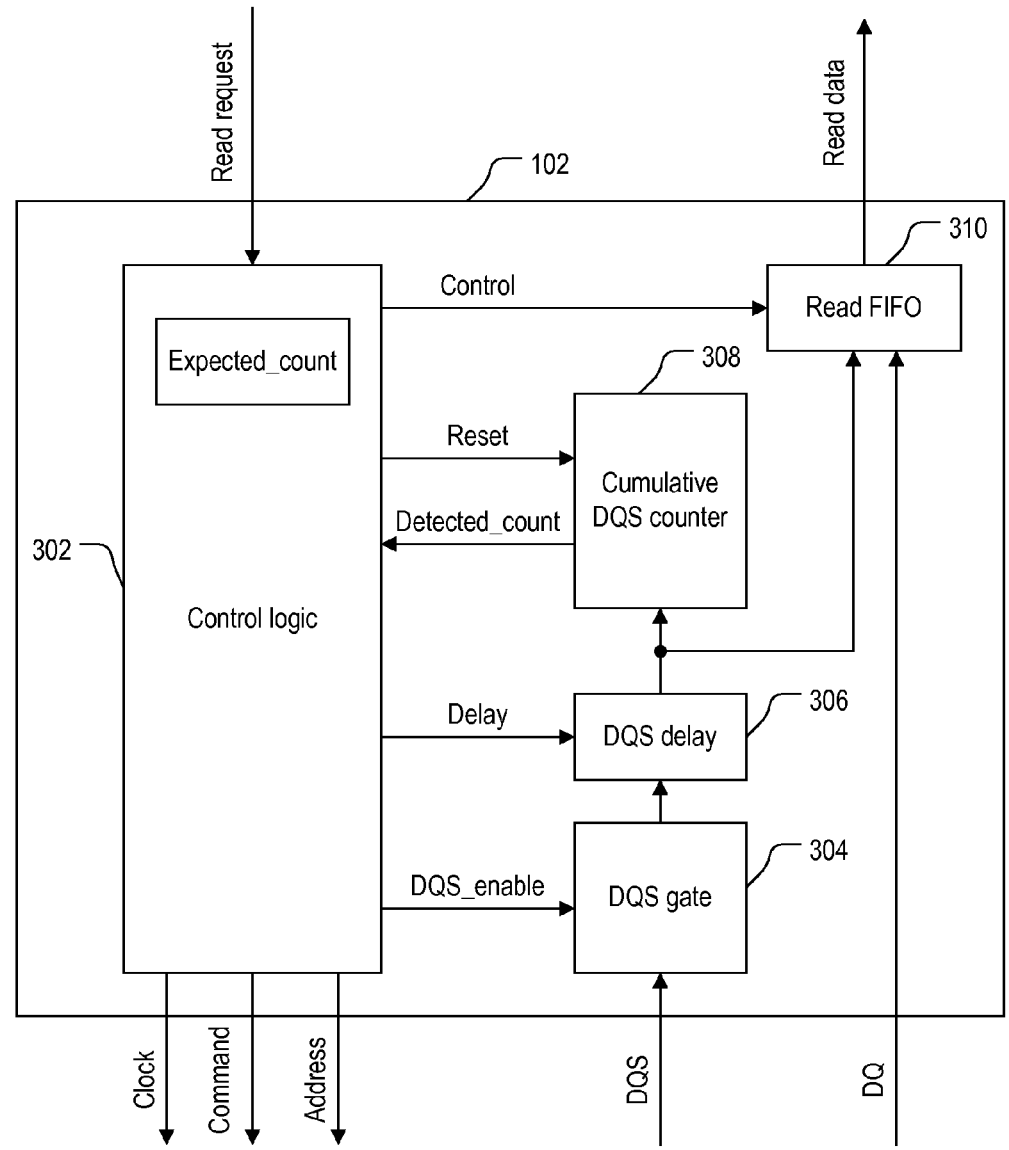
FIG. 3 is a block diagram of the memory controller of FIG. 1 in one embodiment of the invention.

FIG. 3 illustrates a block diagram of memory controller 102 in one embodiment of the invention. Memory controller 102 includes control logic 302 that manages memory operations. Control logic 302 generates the command and the address signals to memory device 104. Control logic 302 also generates control signals to a data strobe gate circuit 304, a data strobe delay circuit 306, a data strobe counter circuit 308, and a read buffer 310 as explained later. Control logic 302 may be conventionally implemented with state machines and other control circuitry.

Gate circuit 304 is coupled to data strobe line DQS. When a control signal DQS_enable is in a first state (e.g., high), gate circuit 304 passes the data strobe signal to delay circuit 306. When control signal DQS_enable is in a second state (e.g., low), gate circuit 304 blocks the data strobe signal from reaching delay circuit 306.

Delay circuit 306 adds a delay to the data strobe signal in order to center it with the data signal. Control logic 302 may set delay circuit 306 with the appropriate delay. Delay circuit 306 outputs a delayed data strobe signal to strobe counter 308 and read buffer 310. Delayed circuit 306 may be conventionally implemented with a programmable delayed locked loop.

Counter circuit 308 increments a detected strobe count whenever it detects a transition (either a rising or a falling edge) in the data strobe signal. Counter circuit 308 outputs the detected strobe count to control logic 302. Control logic 302 may reset counter circuit 308 to clear the detected strobe count. Counter circuit 308 may be conventionally implemented with interconnected flip-flops.

Read buffer 310 captures the data values on data line DQ in response to the delayed strobe signal, buffers the data values, and then outputs the data values. Read buffer 310 may be conventionally implemented as follows. Data inputs of flip-flops are connected to receive data signal DQ. The outputs of a one-hot shift register are connected to the clock inputs of the flip-flops to sequentially clock out the value of data signal DQ in response to the rising and the falling edges of the delayed data strobe signal DQS. Inputs of a multiplexer are connected to the data outputs of the flip-flops. The values of data signal DQ are sequentially selected as the output of the multiplexer by control logic 302.

Figure 4:
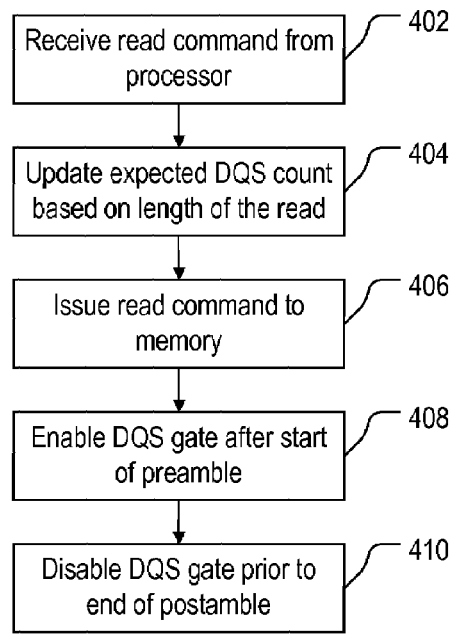
FIG. 4 is a flowchart of a method for control logic of the memory controller of FIG. 1 to keep an expected strobe count and a detected strobe count in one embodiment of the invention.
Figure 5:
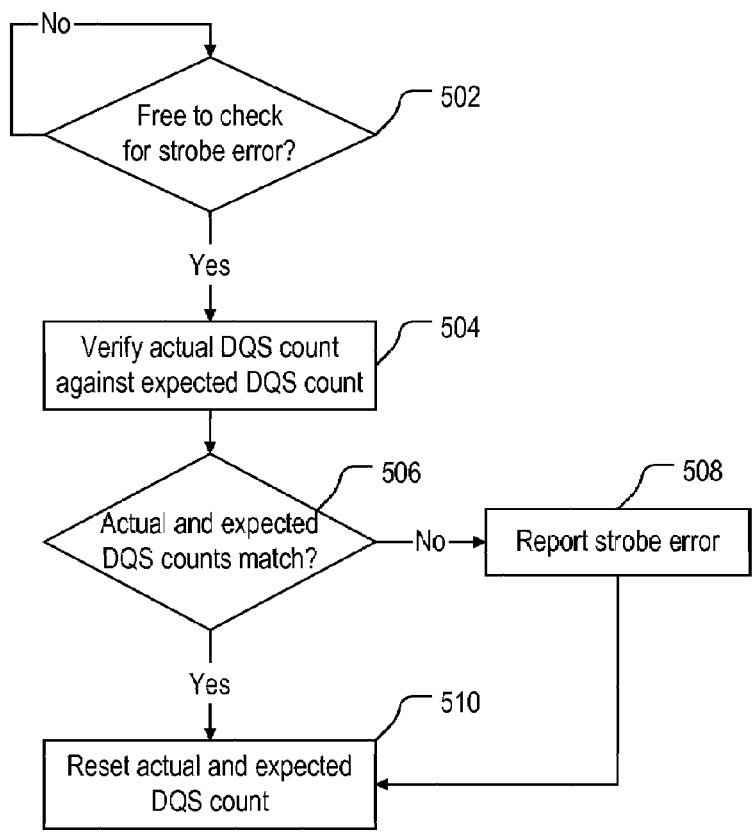
FIG. 5 is a flowchart of a method for control logic of the memory controller of FIG. 1 to determine whether a strobe error has occurred in one embodiment of the invention.

FIG. 4 illustrates a method 400 for control logic 302 to track both an expected strobe count and the detected strobe count in one embodiment of the invention, and FIG. 5 illustrates a method 500 for control logic 302 to report a strobe error to memory controller client 106 in one embodiment of the invention.

Referring method 400 in FIG. 4, in step 402, control logic 302 receives a read request from memory controller client 106. The read request specifies the burst length of the data to be read.

In step 404, control logic 302 increments the expected strobe count by a number of strobes that corresponds to the burst length of the read request. For example, I number of strobes may correspond to a J-bytes read.

In step 406, control logic 302 issues the appropriate read command and address to memory device 104.

In step 408, control logic 302 asserts a high DQS_enable signal to enable gate circuit 304 just after the start of the preamble in the data strobe signal. Control logic 302 does this by asserting DQS_enable X system clock cycles plus a programmable delay after issuing the read command. The X system clock cycles correspond to the read latency of memory device 104. The programmable delay is set according to the physical setup, such as the number of memory devices connected to memory controller 102 and the distance from the memory devices to memory controller 102. Once gate circuit 304 is enabled, counter circuit 308 starts to receive the delayed data strobe signal and begins to increment the detected strobe count.

In step 410, control logic 302 asserts a low DQS_enable signal just prior to the end of the postamble in the data strobe signal. Control logic 302 does this by asserting DQS_enable low Y system clock cycles plus the programmable delay after asserting DQS_enable high. The Y system clock cycles correspond to the burst length of the requested read. Once gate circuit 304 is disabled, counter circuit 308 no longer receives the delayed data strobe signal and stops to increment the detected strobe count.

Referring method 500 in FIG. 5, in step 502, control logic 302 determines if it is free to check for strobe error. Control logic 302 is free to check for strobe error when memory controller 102 is idle or when control logic 302 is processing a write request or refreshing. To summarize, memory controller 102 is free to check for error when it is not expecting data strobe signal DQS in response to a read of a memory device. If control logic 302 is free to check for strobe error, then step 502 is followed by step 504. Otherwise step 502 repeats so that control logic 302 periodically determines to see if it is free to check for strobe error. Note that in one embodiment, memory controller client 106 can force control logic 302 to idle and check for strobe error.

In step 504, control logic 302 reads the detected strobe count from counter circuit 308. Step 504 is followed by step 506.

In step 506, control logic 302 determines if the detected and the expected strobe counts match. If the detected and the expected strobe counts do not match, then step 506 is followed by step 508. Otherwise step 506 is followed by step 510.

In step 508, control logic 302 reports a data strobe error. Depending on the embodiment, control logic 302 may report the data strobe error to memory controller client 106 or to other components (hardware or software). Step 508 is followed by step 510.

In step 510, control logic 302 clears the detected and the expected strobe counts. Control logic 302 clears the detected strobe count by asserting a Reset signal to counter circuit 308.

Note that it is not possible to always report a data strobe error on the read operation that caused the error. In a long burst of read transfers, there is no time between back-to-back reads to check for an error. This means the error is only reported after the end of the burst. A data strobe error is reported only after the erroneous data has been read. This is an uncorrectable error as there is no means of locating the incorrect data without degrading performance.

Various other adaptations and combinations of features of the embodiments disclosed are within the scope of the invention. Numerous embodiments are encompassed by the following claims.

What is claimed is:

1. A method for a memory controller to check a data strobe signal from a dual data rate memory device, comprising:
   receiving a read request from a memory controller client;
   incrementing an expected strobe count by a first number of edges expected in the data strobe signal in response to the read request;
   issuing a read command to the memory device;
   receiving a data signal and the data strobe signal from the memory device;
   after a start of a preamble in the data strobe signal, using a data strobe counter to increment a detected strobe count by a second number of edges detected in the data strobe signal; and
   before an end of a postamble in the data strobe signal, preventing the data strobe counter from incrementing the detected strobe count.

2. The method of claim 1, wherein:
   said using a data strobe counter to increment a detected strobe count comprises enabling a data strobe gate to pass the data strobe signal to the data strobe counter; and said preventing the data strobe counter from incrementing the detected strobe count comprises disabling the data strobe gate.

3. The method of claim 1, wherein the edges expected and the edges detected are at least one of rising edges and falling edges.

4. The method of claim 1, when the memory controller is not expecting the data strobe signal from the memory device, further comprising:
  comparing the expected and the detected strobe counts; and
  reporting a data strobe error when the expected and the detected strobe counts do not match.

5. The method of claim 4, wherein the memory controller is not expecting the data strobe signal from the memory device when the memory controller is idle without any activity or forced to be idle from activity.

6. The method of claim 4, wherein the memory controller is not expecting the data strobe signal from the memory device when the memory controller is processing a write request or refreshing.

7. The method of claim 4, when the memory controller is free, further comprising:
  resetting the expected and the detected strobe counts after said comparing and said reporting.

8. The method of claim 1, wherein the memory controller client is a processor.

9. A memory controller for a memory device, comprising:
  a data strobe gate circuit coupled to receive a data strobe signal from the memory device, the data strobe gate circuit being configured to pass or block the data strobe signal in response to at least a control signal;
  a data strobe delay circuit coupled to receive the data strobe signal from the data strobe gate circuit, the data strobe delay circuit being configured to delay the data strobe signal;
  a data buffer coupled to receive a data signal from the memory device and the data strobe signal from the data strobe delay circuit, the data buffer being configured to capture values of the data signal in response to the data strobe signal;
  a data strobe counter coupled to receive the data strobe signal, the data strobe counter being configured to increment a detected strobe count by a first number of edges detected in the data strobe signal; and
  a control logic coupled sending the control signal to the data strobe gate circuit and receiving the detected strobe count from the data strobe counter, the control logic being configured to:
    increment an expected strobe count by a second number of edges expected in the data strobe signal in response to each read request to the memory device;
    enable the data strobe gate circuit to pass the data strobe signal to the data strobe delay circuit after a start of a preamble in the data strobe signal; and
    disabling the data strobe gate circuit to block the data strobe signal before an end of a postamble in the data strobe signal.

10. The memory controller of claim 9, wherein the control logic being further configured to, when the memory controller is not expecting the data strobe signal from the memory device:
  compare to the detected and the expected strobe count; and
  report a data strobe error when the expected and the detected strobe counts do not match.

11. The memory controller of claim 10, wherein the memory controller is not expecting the data strobe signal from the memory device when the memory controller is idle from activity or forced to be idle from activity.

12. The memory controller of claim 10, wherein the memory controller is not expecting the data strobe signal from the memory device when the memory controller is processing a write request or refreshing.

13. The memory controller of claim 10, wherein the control logic being further configured to, when the memory controller is free:
  reset the expected and the detected strobe counts after said comparing and said reporting.

* * * * *